US008380358B2

(12) United States Patent
Karandikar et al.

(10) Patent No.: US 8,380,358 B2
(45) Date of Patent: Feb. 19, 2013

(54) SWITCHGEAR DATA SYSTEM

(75) Inventors: Harsh Karandikar, Longwood, FL (US); Marek Budyn, Cracow (PL)

(73) Assignee: ABB Technology AG, Zurich (CH)

( * ) Notice: Subject to any disclaimer, the term of this patent is extended or adjusted under 35 U.S.C. 154(b) by 560 days.

(21) Appl. No.: 12/613,738

(22) Filed: Nov. 6, 2009

(65) Prior Publication Data

US 2010/0121500 A1    May 13, 2010

Related U.S. Application Data

(60) Provisional application No. 61/112,365, filed on Nov. 7, 2008.

(51) Int. Cl.
G05D 11/00    (2006.01)
(52) U.S. Cl. .................... 700/295; 370/245; 703/18
(58) Field of Classification Search .............. 703/18; 700/295; 370/245
See application file for complete search history.

(56) References Cited

U.S. PATENT DOCUMENTS

| 2004/0131361 | A1 | 7/2004 | Bischoff | |
|---|---|---|---|---|
| 2006/0117295 | A1* | 6/2006 | Wu et al. | 717/104 |
| 2007/0213956 | A1* | 9/2007 | Nasle et al. | 702/182 |
| 2007/0239373 | A1* | 10/2007 | Nasle | 702/58 |
| 2007/0285079 | A1* | 12/2007 | Nasle | 324/76.22 |
| 2007/0286089 | A1* | 12/2007 | Nasle et al. | 370/245 |
| 2008/0109205 | A1* | 5/2008 | Nasle | 703/18 |
| 2008/0215302 | A1* | 9/2008 | Nasle et al. | 703/13 |
| 2008/0262820 | A1* | 10/2008 | Nasle | 703/18 |
| 2008/0263469 | A1* | 10/2008 | Nasle et al. | 715/771 |
| 2009/0063122 | A1* | 3/2009 | Nasle | 703/18 |
| 2009/0076749 | A1* | 3/2009 | Nasle | 702/62 |
| 2009/0083019 | A1* | 3/2009 | Nasle | 703/18 |
| 2009/0099832 | A1* | 4/2009 | Nasle | 703/18 |
| 2009/0105998 | A1* | 4/2009 | Radibratovic et al. | 703/2 |
| 2009/0314615 | A1* | 12/2009 | Christensen et al. | 200/17 R |

FOREIGN PATENT DOCUMENTS

| DE | 20101830 U1 | 3/2002 |
|---|---|---|
| DE | 202007001543 U1 | 7/2004 |
| DE | 202007004904 U1 | 7/2007 |
| EP | 0903653 A2 | 3/1999 |
| EP | 29191839 U1 | 3/2002 |
| WO | 2009012952 A2 | 1/2009 |
| WO | 2010054143 A1 | 5/2010 |

OTHER PUBLICATIONS

Olivier Castagne, Written Opinion of the International Searching Authority, International Application No. PCT/US2009/063483, Date of Issuance of report May 10, 2011, European Patent Office.

* cited by examiner

*Primary Examiner* — Mohammad Ali
*Assistant Examiner* — Anthony Whittington
(74) *Attorney, Agent, or Firm* — Paul R. Katterle; Michael C. Prewitt

(57) ABSTRACT

A switchgear assembly provides on-board documentation and includes a switchgear adapted to distribute electrical power to a plurality of loads. An industrial computer includes storage, a web server service and a wireless broadcasting device. The storage stores switchgear specific documentation. A mobile computing device wirelessly communicates with the industrial computer through the wireless broadcasting device. The mobile computing device includes a web browser and the documentation is provided to the mobile computing device by the web server service.

10 Claims, 4 Drawing Sheets

US 8,380,358 B2

SWITCHGEAR DATA SYSTEM

This application claims priority to U.S. Provisional Application No. 61/112,365 filed on Nov. 7, 2008 and titled Switchgear Data System, the contents of which are incorporated by reference in their entirety.

BACKGROUND

Switchgear are used in conjunction with electric power systems and generally include a combination of electrical disconnects, fuses and/or circuit breakers that operate to selectively isolate electrical loads. A switchgear may be used both to de-energize loads to allow maintenance or installation work to be done and also to clear downstream faults. Switchgears are located anywhere that electrical distribution, isolation and/or protection may be required. These locations may include, for example, generators, motors, and transformers in factories, power plants and substations.

With reference to FIG. 1, a simplified exemplary switchgear is shown schematically. Switchgear 10 includes at least one input power source 12. Electricity from the power source 12 travels through a current transformer 14 which monitors the amount of current traveling therethrough. Electricity from the power source 12 flows through a main circuit breaker 16 which is electrically connected to a bus 18. Bus 18 transmits power to loads 20. As can be seen, typically a load side current transformer 22 and circuit breaker 24 is electrically connected between the bus 18 and respective load 20. Switchgear include low voltage and high voltage compartments. Specifically, the low voltage compartments are compartments within a switchgear that are isolated from high voltage bus components.

Switchgear are very important, both from a safety and productivity standpoint. Thus, having easy access to switchgear information/data is essential for both installation and operation. In particular, schematics, product information and guidelines are needed for proper installation and maintenance of switchgear. In the past such information was provided in the form of paper manuals that can get worn out or be lost or discarded. More recently, switchgear documentation has been provided in electronic form in stand-alone computers connected to the switchgear via SCADA or other network link. In other configurations, the documentation is provided locally at the switchgear and accessed through a panel mounted computer. Though these solutions are in some ways more effective than paper documentation, the systems are not flexible and are difficult to retrofit and to keep updated.

Thus, there is a need in the art for an improved switchgear data system that is flexible and easy to use.

SUMMARY OF THE INVENTION

According to one aspect of the present invention, a switchgear assembly is provided with on-board documentation. The switchgear assembly includes a switchgear adapted to distribute electrical power to a plurality of individual loads. An industrial computer has storage, wireless broadcasting device and a set of data-sharing services. The storage stores switchgear specific documentation. A mobile computing device is adapted to wirelessly communicate with the industrial computer through the wireless broadcasting device. The mobile computing device includes a web browser and the documentation is provided to the mobile computing by said data-sharing service.

DETAILED DESCRIPTION OF THE EMBODIMENT(S)

Figure 1:
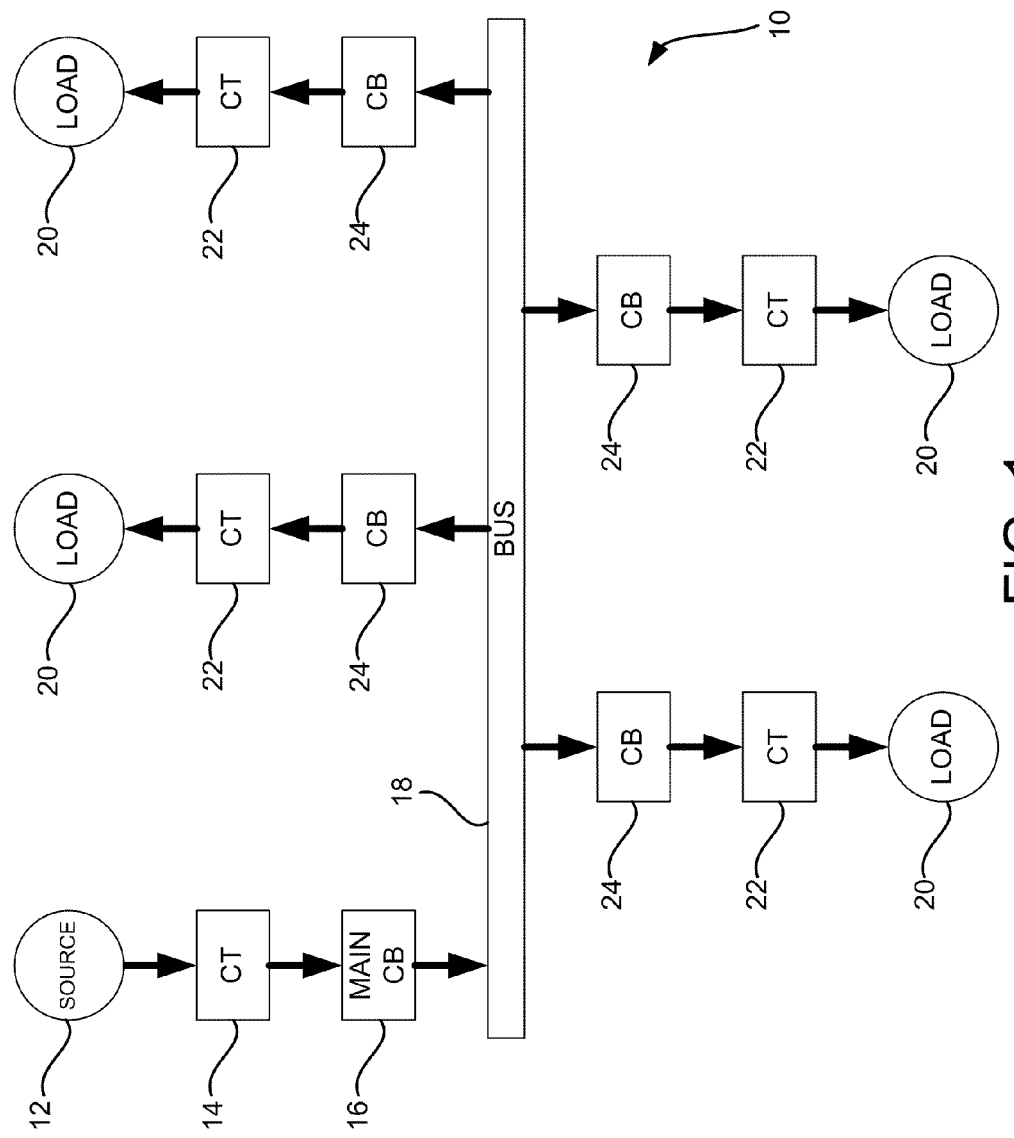
FIG. 1 is a schematic view of the internal electrical circuit for a switchgear.

It should be noted that in the detailed description that follows, identical or similar components may have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
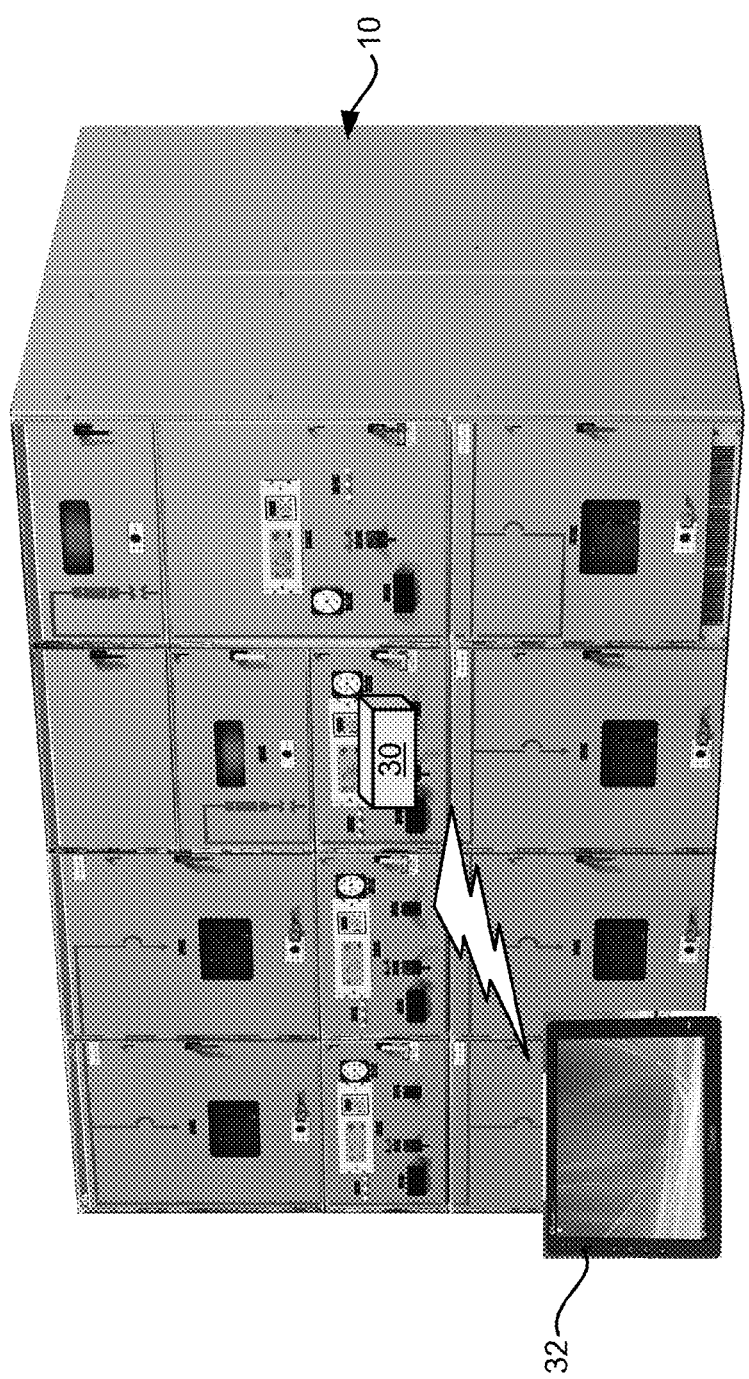
FIG. 2 is a perspective view of a switchgear and mobile computing device according to the present invention.

With reference to FIG. 2, a switchgear 10 is shown. Switchgear 10 includes a data system that conveniently provides data to installers, service personnel and operators. The data system includes an industrial computer 30 mounted within a low voltage compartment in the switchgear enclosure. Industrial computer 30 stores switchgear specific documentation including schematics, blueprints, manuals, and installation/maintenance instructions. Industrial computer 30 communicates with a mobile computing device 32 which enables a user to search and view the documentation. The communication between mobile computing device 32 is preferably wireless, however, a wired connection (e.g., Ethernet or USB) may be provided as a backup.

Figure 3:
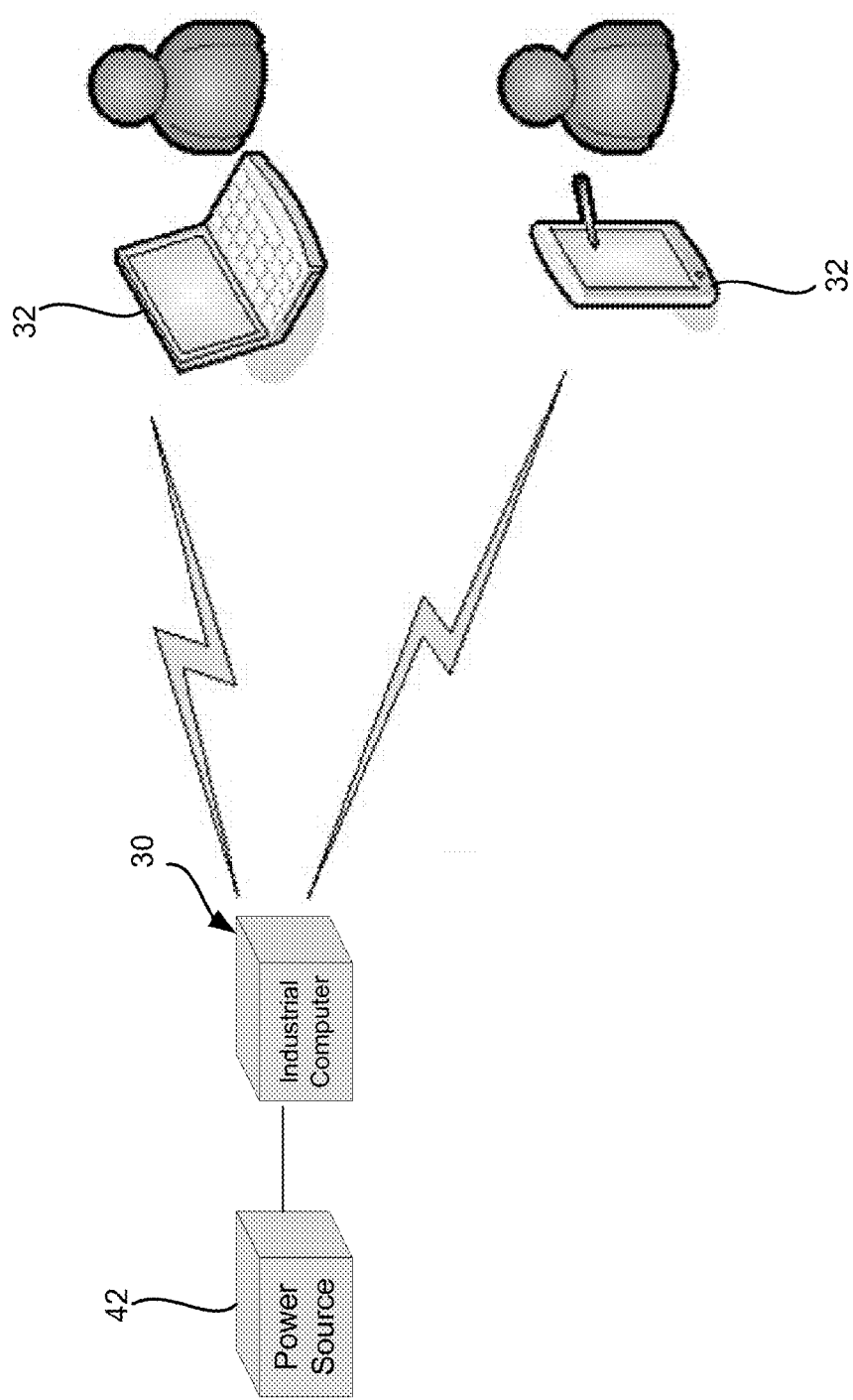
FIG. 3 is a schematic view of the industrial computer and mobile computing device according to the present invention.

With reference to FIG. 3, industrial computer 30 includes storage which may be in the form of a hard drive, flash based memory or any other type of storage media. Industrial computer 30 functions as a web server and accordingly provides Domain Name Service (DNS) and Dynamic Host Configuration Protocol (DHCP). Finally, industrial computer 30 includes a wireless broadcasting device. According to one embodiment, wireless broadcast device is a WiFi adapter. The wireless broadcasting device enables wireless communication with one or more mobile computing devices 32. Mobile computing devices 32 may be in the form of, for example, a ruggedized tablet PC with a touch screen or a standard laptop.

Generally, the role of the 'Server' is to share data over a network. The 'Client', in the present invention, is the mobile computing device, such as the tablet or laptop computer that requests and downloads data over the network. According to one embodiment, the client is a 'thin' client because all documentation data is stored on the server and downloaded to the client in real-time. According to the present invention, the only software required on the client machine, apart from an appropriate operating system, is a web browser.

The industrial computing device 30, functioning as a server, provides several services. A WEB server service handles all HTTP traffic on the network and is a type of 'application server'. Hierarchically, under the WEB server is a WEB application (implemented in Microsoft .NET Framework for example) that contains business logic of the system. The WEB server sends HTTP requests to the WEB application which handles them and generates proper responses. The WEB application is also responsible for application level authentication (e.g., password or electronic certificate check) and authorization (e.g., distinguishing a user between administrator, operator, and servicemen and allowing appropriate functionalities). Data storage may be in the form of a database that stores all documentation data, however, other forms of storage may be provided. For example, simple directory-structured storage may be provided. According to one embodiment, the communication protocol between the client and server is HTTP. However, other communication protocols may be used, such as HTTPS.

The industrial computer also provides DHCP (Dynamic Host Configuration Protocol) to automatically configure networked devices. DHCP assigns proper IP address and DNS server addresses to the clients that connect to the service. A DNS (Domain Name Service) is also provided to resolve web browser addresses. The DNS translates names into IP addresses in TCP/IP networks.

According to one embodiment, the client is a thin-client device requiring only a web browser that supports, for example, javascript and CSS. Generally, the client connects to a PAN (Personal Area Network) according to the method described herein below. The client employs a browser to connect to the WEB application. The connection is made using system components so user can browse available networks using hardware independent tools.

The use of a standard web browser enables very flexible operations so that a wide range of client hardware and software may be used (web browsers are available on Windows, Linux, Solaris, etc.). In one or more embodiments, a wireless connection helper tool may be provided to help a user connect to wireless networks. In other embodiments, native wireless connection tools (e.g., default tools in the Windows operating system) may be used. A wireless connection helper tool may visualize available PANs and initialize connections. Thereafter, the web browser may be initialized and operate as described above.

According to one embodiment, a separate, 'thick' application may be provided and adapted to prepare configuration and/or upload information to the server. This thick application may be provided on any client device. The thick application may also prepare the various pieces of documentation for upload onto the switchgear server. Preparation may involve establishing all the inter-links between the documents, especially the documents and the drawings (e.g., selectable hotspots).

The PAN may be established using various techniques. According to one embodiment, an 802.11 a/b/g/n network (WiFi) in Peer-To-Peer mode may be employed. This type of network advantageously provides a large communication range and a high transfer rate (1-54 MBit/s, 300 MBit/s in n version at peak). Moreover, 802.11 networks have several available authentication methods: PSK (pre-shared key) or certificate authentication. These networks also allow communication to be encrypted using WEP, WPA/AES, WPA/TKIP methods.

A PAN may also be provided using Bluetooth, but this requires an additional communication module on the server. Bluetooth supports PAN network services also with security and encryption. Compared to 802.11 networks, the transfer rate of Bluetooth is lower (up to 1 MBit/s at peak). Further, communication range is limited and security protocols are less effective.

According to one embodiment, the mobile computing device may be connected to the server using a T1 cable connection (Ethernet). One can connect to the server using ethernet cable (crossed) or connect it to customer's site network. In this case only authentication/authorization method implemented on WEB application will be used and DNS and/or DHCP services might be disabled so they do not interfere with customer's infrastructure.

After installation, and during normal operation, industrial computer 30 may draw power from the AC power source 12. However, prior to and during installation, an independent power source 42 may provide power to industrial computer. According to one embodiment, independent power source 42 is a battery.

According to one embodiment, the data residing on the industrial computer 30 is accessible on the mobile computing device via a standard web browser such as Windows Explorer or Mozilla Firefox. In this manner, no custom software installation is necessary. Because the information is accessible from a browser, all information may be provided using the http protocol. Menus may be provided in the browser that allows the user to navigate through all the documentation. Keyword search functions are also provided.

The data system is used according to the following description. When switchgear 10 ships from a factory, the most current project specific documentation is uploaded to the industrial computer. Documentation may be stored in any format. In one embodiment, documents are stored in searchable PDF format. Still further, CAD drawings and 3D CAD models may be provided. Accordingly, the mobile computing device may include software capable of reading PDF and CAD drawings, for example, Adobe Reader and eDrawings Viewer. The industrial computer 30 is also provided with a password that must be input prior to accessing the documentation. When switchgear 10 is shipped to a customer, the ruggedized tablet computer 32 is also provided. The ruggedized tablet computer may have the password pre-stored or the password may be provided separately. When the customer unpacks switchgear 10 on-site the user activates the industrial computer 30. This is typically done via a switch or button on or in the switchgear. Using the password the customer signs onto the "on-board" documentation system. When the user is finished retrieving and viewing the documentation, a log-off command is sent and the industrial computer goes into a sleep mode. In addition, the industrial computer may enter sleep mode after a predetermined time period of inactivity.

When or if new or updated documentation becomes available for a switchgear, the industrial computer may be updated via the mobile computing device 32. In such a case, the manufacturer may include additional security, so that update access codes must be input before allowing the updating of any documentation.

Multiple switchgear, each with a pre-installed industrial computer, may be accessed by a single mobile computing device. When a mobile computing device comes in range of a switchgear, the switchgear wireless signal identifies the switchgear with a unique identifier. The identifier may be a serial number, location descriptor or any other identifying word or symbol. The available wireless signals (corresponding to individual switchgears) may be displayed visually to a user on the mobile computing device. A user may then select a switchgear of interest. After selecting a specific switchgear, a user must then authenticate by one or more means, such as a network key, password, etc. Once authenticated, the user can access any documentation stored on the industrial computer. In this manner, the mobile computing device enables mobile viewing of manuals and documentations. Further, more than one person can view a document at the same time. Thus, during installation or maintenance, each service person can have their own 'copy' of documentation on a personal mobile computing device.

Figure 4:
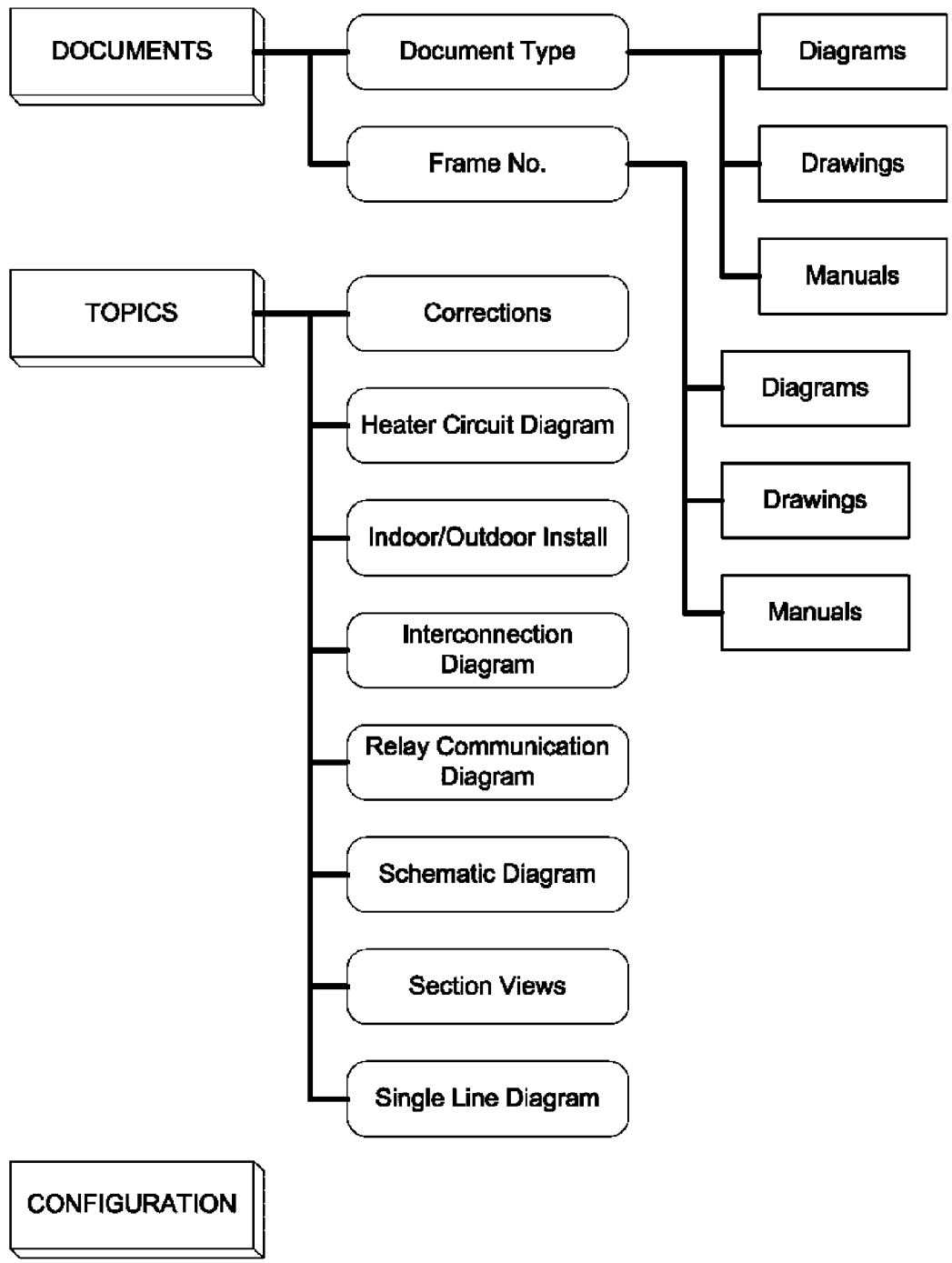
FIG. 4 shows an exemplary data hierarchical structure.

With reference now to FIG. 4, an exemplary menu hierarchy is shown that includes major topics including Documents, Topics and Configuration. Under Documents, a user may select Document Type which shows the documents sorted by type (drawings, diagrams, manuals) or frame number. By selecting Topics a user is presented with a variety of commonly requested information topics. Within each specific topic a user may be presented with all documents related to that topic including drawings, diagrams and/or manuals. If a user selects configuration, various server configuration options may be presented. Still further, the viewing software on the mobile computing device may include a search function, wherein a user may keyword search all available documentation.

Industrial computer 30 may also provide status and performance information wirelessly to the mobile computing device. For example, the industrial computer may monitor and store switchgear condition data, such as node temperatures, current levels, and/or breaker activity. Such information may be uploaded onto the mobile computing device upon demand for operator review. Still further, industrial computer 30 may transmit real-time data streams such as node temperatures, voltages and currents.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

We claim:

1. A switchgear installation comprising:
a first switchgear that distributes electrical power to a plurality of loads and has a low voltage compartment;
a first industrial computer secured within said low voltage compartment of said first switchgear, said first industrial computer having storage, a web server service and a wireless broadcasting device, said storage storing documentation specific to said first switchgear and said wireless broadcasting device transmitting a first wireless signal with an identifier unique to said first switchgear;
a second switchgear that distributes electrical power to a plurality of loads and has a low voltage compartment;
a second industrial computer secured within said low voltage compartment of said second switchgear, said second industrial computer having storage, a web server service and a wireless broadcasting device, said storage storing documentation specific to said second switchgear and said wireless broadcasting device transmitting a second wireless signal with an identifier unique to said second switchgear;
a mobile computing device that receives said first and second wireless signals from said wireless broadcasting devices of said first and second industrial computers, respectively, said mobile computing device including a web browser; and
wherein said web browser of said mobile computing device obtains said documentation for said first and second switchgears from said web server services of said first and second industrial computers through said first and second wireless signals, respectively.

2. The switchgear installation of claim 1 wherein said switchgear specific documentation for each of the first and second switchgears includes switchgear schematics, switchgear blueprints, and switchgear manuals.

3. The switchgear installation of claim 1 wherein said mobile computing device includes a tablet PC.

4. The switchgear installation of claim 1 wherein said mobile computing device includes a laptop computer.

5. The switchgear installation of claim 1 further comprising a battery for powering said first industrial computer prior to and during installation of said first switchgear.

6. The switchgear installation of claim 1 further comprising a plurality of mobile computing devices adapted to wirelessly communicate with said first and second industrial computers through said wireless broadcasting device.

7. The switchgear installation of claim 1, wherein said web browser of said mobile computing device obtains said documentation for said first switchgear from said web server service of said first industrial computer only after a password is provided to said first industrial computer.

8. The switchgear installation of claim 1, wherein said mobile computing device displays to a user that said first and second wireless signals are available and allows said user to select one of said first and second wireless signals.

9. The switchgear installation of claim 8, wherein after said mobile computing device receives a selection of one of said first and second wireless signals, said mobile computing device displays said documentation for said first switchgear or said second switchgear corresponding to said selection.

10. The switchgear installation of claim 1, wherein said mobile computing device is a thin-client device.

* * * * *